(12) United States Patent
Holland

(10) Patent No.: US 11,258,921 B2
(45) Date of Patent: *Feb. 22, 2022

(54) DEFINE A PRIORITY OF MEMORY TRAFFIC BASED ON IMAGE SENSOR METADATA

(71) Applicant: INTEL CORPORATION, Santa Clara, CA (US)

(72) Inventor: Wesley J. Holland, Austin, TX (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/098,820

(22) Filed: Nov. 16, 2020

(65) Prior Publication Data
US 2021/0067656 A1 Mar. 4, 2021

Related U.S. Application Data

(63) Continuation of application No. 16/308,532, filed as application No. PCT/US2017/035508 on Jun. 1, 2017, now Pat. No. 10,841,451, which is a continuation of application No. 15/200,074, filed on Jul. 1, 2016, now abandoned.

(51) Int. Cl.
*H04N 1/21* (2006.01)
*G06F 13/18* (2006.01)

(52) U.S. Cl.
CPC .......... *H04N 1/2133* (2013.01); *G06F 13/18* (2013.01); *H04N 2201/0084* (2013.01)

(58) Field of Classification Search
CPC .................. H04N 1/2133; H04N 5/335
See application file for complete search history.

(56) References Cited

U.S. PATENT DOCUMENTS

| | | | |
|---|---|---|---|
| 6,985,181 B2 | 1/2006 | Ewedemi et al. | |
| 8,588,241 B1 | 11/2013 | Li et al. | |
| 10,841,451 B2* | 11/2020 | Holland | G06F 13/18 |
| 2011/0310257 A1 | 12/2011 | Armstrong | |
| 2012/0072677 A1 | 3/2012 | Biswas et al. | |
| 2014/0068201 A1 | 3/2014 | Fromm | |
| 2014/0280885 A1 | 9/2014 | Ayandeh et al. | |
| 2015/0373735 A1 | 12/2015 | Thurbert et al. | |

(Continued)

FOREIGN PATENT DOCUMENTS

WO 2018004984 A1 1/2018

OTHER PUBLICATIONS

International Search Report and Written Opinion received for PCT/US2017/035508, dated Sep. 12, 2017. 11 pages.

(Continued)

*Primary Examiner* — Christopher K Peterson
(74) *Attorney, Agent, or Firm* — Hanley, Flight & Zimmerman, LLC

(57) ABSTRACT

Systems, apparatuses, and/or methods may define a priority of image memory traffic based on image sensor protocol metadata. For example, a metadata identifier may identify image sensor protocol metadata corresponding to an image sensor physical layer and/or an image sensor link layer. Moreover, a prioritizer may define a priority of the image memory traffic based on the image sensor protocol metadata. The priority may be used to control client access to dedicated memory and/or to shared memory.

26 Claims, 3 Drawing Sheets

(56) References Cited

U.S. PATENT DOCUMENTS

2016/0191420 A1 6/2016 Nagarajan et al.
2018/0007226 A1 1/2018 Holland
2019/0166281 A1 5/2019 Holland

OTHER PUBLICATIONS

International Preliminary Report on Patentability received for PCT/US2017/035508, dated Jan. 1, 2019. 8 pages.
United States Patent and Trademark Office, "Non-Final Office Action," dated Aug. 31, 2017 in connection with U.S. Appl. No. 15/200,074, 15 pages.
United States Patent and Trademark Office, "Final Office Action," dated Apr. 13, 2018 in connection with U.S. Appl. No. 15/200,074, 12 pages.
United States Patent and Trademark Office, "Non-Final Office Action," dated Mar. 26, 2020 in connection with U.S. Appl. No. 16/308,532, 15 pages.
United States Patent and Trademark Office, "Notice of Allowance," dated Jul. 13, 2020 in connection with U.S. Appl. No. 16/308,532, 8 pages.

* cited by examiner

DEFINE A PRIORITY OF MEMORY TRAFFIC BASED ON IMAGE SENSOR METADATA

CROSS-REFERENCE RELATED APPLICATIONS

The present application is a continuation of U.S. patent application Ser. No. 16/308,532 filed on Dec. 10, 2018, which is a U.S. National Stage Entry of PCT Application No. PCT/US2017/035508 filed on Jun. 1, 2017, which is a continuation of U.S. patent application Ser. No. 15/200,074 filed on Jul. 1, 2016, the disclosures of which are each incorporated by reference herein in their entirety.

TECHNICAL FIELD

Embodiments generally relate to memory traffic prioritization. More particularly, embodiments relate to defining a priority of image memory traffic based on image sensor metadata.

BACKGROUND

Memory, such as dynamic random access memory (DRAM), may be accessed by an image signal processor (ISP), a graphics processing unit (GPU), and a central processing unit (CPU), and so on. DRAM memory traffic generated from a camera interface may have high peak bandwidth as pixel data is offloaded to a system-on-chip (SoC) and may have a negative impact on system function and/or system power if not sufficiently managed. For example, a bad priority indicator of memory traffic used to arbitrate memory access among clients may starve the clients of memory bandwidth (e.g., restrict access to shared memory) and/or may cause performance issues such as frame stuttering. Moreover, DRAM may be forced into unnecessarily high power states (e.g., reduce self-refresh) when a bad indicator of high priority traffic is used.

A larger on-chip buffer may be implemented to mitigate the impact of a bad priority indicator and/or multiple clients. In this regard, image data may buffer-up for a longer time period. Also, shared memory may be left in a self-refresh state for a longer time period. Moreover, memory traffic from one client may be buffered while another client accesses shared memory. A larger buffer may, however, occupy valuable silicon area and/or may increase cost or complexity. Additionally, weighing based on traffic pattern estimation may be used in an attempt to address unnecessary restriction of access to shared memory. Weighing based on traffic pattern estimation, however, may be labor and time intensive, and/or may require complex retuning for different camera sensors. Thus, there is considerable room for improvement to prioritize memory traffic.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
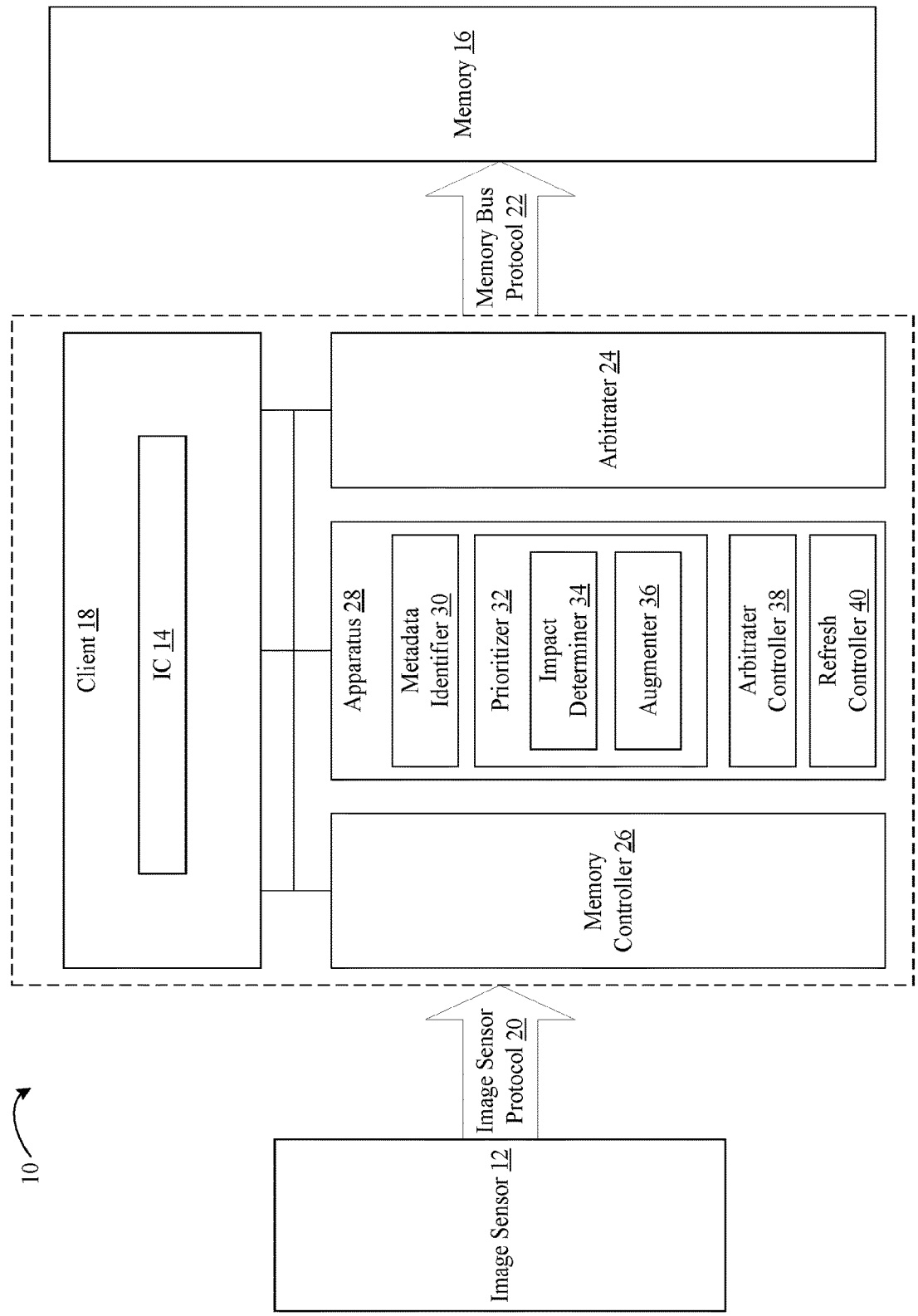
FIG. 1 is a block diagram of an example of a system to define a priority of memory traffic according to an embodiment.

Turning now to FIG. 1, a system 10 is shown to define a priority of memory traffic according to an embodiment. The system 10 may include a computing platform such as a laptop, a personal digital assistant (PDA), a media content player, a mobile Internet device (MID), a computer server, a gaming platform, any smart device such as a wireless smart phone, a smart tablet, a smart TV, a smart watch, and so on. In the illustrated example, the system 10 includes a mobile computing platform (e.g., a smart phone) that may capture, process, store, provide, and/or display an image.

The system 10 may include communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LiFi (Light Fidelity, e.g., IEEE 802.15-7, Wireless Local Area Network/LAN Medium Access Control (MAC) and Physical Layer (PHY) Specifications), 4G LTE (Fourth Generation Long Term Evolution), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), NFC (Near Field Communication, ECMA-340, ISO/IEC 18092), and other radio frequency (RF) purposes. Thus, the system 10 may capture, process, store, provide, and/or display image data locally on the system 10 and/or remotely off the system 10.

As shown in FIG. 1, the system 10 includes an image sensor 12 to capture an image for a video, a photograph, and so on. The image sensor 12 may capture electromagnetic radiation in one or more spectrums such as the infrared spectrum, the visible light spectrum, etc. In one example, the image sensor 12 includes a complementary metal-oxide semiconductor (CMOS) image sensor that may provide pixel data corresponding to captured electromagnetic radiation, wherein the pixel data may include luma data (e.g., light quantity) for an image, chroma data (e.g., light color) for an image, depth data for objects in an image, thermal data for objects in an image, and so on.

The system 12 further includes an integrated circuit (IC) 14 to allow the pixel data to be transmitted from the image sensor 12 to memory 16. In the illustrated example, the IC 14 is a part of a client 18 that is allowed access to the memory 16. The client 18 may include, for example, an IC chip such as a system on chip (e.g., a microcontroller, etc.), a processor such as a baseband processor (e.g., an applications processor), an image signal processor (ISP), a graphics processing unit (CPU), a central processing unit (CPU), a virtual processing unit (VPU), and so on. The client 18 may have dedicated access when the memory 16 is dedicated memory and/or may have shared access when the memory 16 is shared memory. Thus, the memory 16 may include dedicated and/or shared random access memory (RAM), read only memory (ROM), programmable ROM (PROM), firmware, flash memory, dynamic RAM (DRAM), etc.

The system 10 implements an image sensor protocol 20 to communicatively couple the IC 14 with the image sensor 12 to transfer the pixel data from the image sensor 12 to the client 18. The image sensor protocol 20 may include an image sensor physical layer protocol (ISPLP) to specify image sensor physical layer communication such as, for example, voltages to accomplish transmission of pixel data from the image sensor 12, speed at which pixel data from the image sensor 12 is to be transmitted, a clock mechanism for pixel data from the image sensor 12, and so on. Additionally, the image sensor protocol 20 may include an image sensor link layer protocol (ISLLP) to specify image sensor link layer communication such as, for example, how data from the image sensor 12 is to be packaged (e.g., packetized, etc.) for transmission.

Notably, the ISPLP and the ISLLP may each support data other than pixel data corresponding to image sensor physical layer communication and image sensor link layer communication, respectively, which may be treated as image sensor protocol metadata to prioritize image memory traffic. Accordingly, while the ISPLP may be manufacturer-specific, image memory traffic may still be prioritized using image sensor protocol metadata from any physical layer protocol such as, for example, Mobile Industry Processor Interface (MIPI®, a trademark of MIPI Alliance) C-PHY, D-PHY, M-PHY, low voltage differential signaling (LVDS), service integration multiple access (SIMA), etc. Similarly, while the ISLLP may be manufacturer-specific, image memory traffic may still be prioritized using image sensor protocol metadata from any link layer protocol such as, for example, MIPI camera serial interface (CSI)-2, CSI-3, UniPro, M-PCIe, etc.

ISPLP metadata may include, for example, image sensor power state mode data, image sensor escape mode data, image sensor clock mode data, and so on. The image sensor power state mode data may include an indication of an ultra-low power state (ULPS) exit or entry, an escape mode (EM) exit or entry, a high-speed clock mode (HSCM) exit or entry, and so on. For example, the image sensor 12 may use appropriate physical voltages to indicate entry to the ULPS and/or exit from the ULPS, which may be treated as ISPLP metadata. The image sensor 12 may also transmit side-band data other than pixel data (e.g., senor data such as gyroscope data, etc.) using low power transmission through entry to the EM, wherein the low power may be treated as ISPLP metadata. The image sensor 12 may also prepare to transmit a relatively large amount of traffic through entry to the HSCM by enabling a high-speed clock and may disable the high-speed clock during in quiescent periods through exit from the HSCM, wherein the clock enablement or disablement may be treated as ISPLP metadata.

ISPLP metadata may also include start of line (SOL) data and/or end of line (EOL) data. For example, pixel lines may be forwarded by the image sensor 12 a line at a time in a high-speed transmission. Thus, a high-speed voltage associated with an SOL and/or a low-speed voltage associated with an EOL may be treated as ISPLP metadata. In another example, some physical layer protocols support transmission of short packets to indicate an SOL and an EOL. Thus, the short packets at the image sensor physical level corresponding to an SOL and an EOL may be treated as ISPLP metadata.

ISLLP metadata may include packetized data such as synchronization short packet data types. In one example, an SOL and/or an EOL may be recovered by the ISLLP from the ISPLP. Thus, SOL data (e.g., line start code in CSI) and/or EOL data (e.g., line end code in CSI) may be treated as ISLLP metadata. In another example, start of frame (SOF) data (e.g., frame start code in CSI) and end of frame (EOF) data (e.g., frame end code in CSI) may be treated as ISLLP metadata. Thus, ISLLP metadata that may be used to prioritize image memory traffic may indicate whether image data (e.g., pixel data) is associated with a beginning of a line of pixels, an end of a line of pixels, a beginning of a frame of an image, a continuation of a frame of an image, an end of a frame of an image, and so on.

The system 10 implements a memory bus protocol 22 to communicatively couple the IC 14 with the memory 16 to transfer image data from the client 18 to the memory 16. The memory bus protocol 22 may specify, for example, how memory traffic is to be transferred from the client 18 to the memory 16. While the memory bus protocol 22 may be manufacturer-specific, image memory traffic may still be prioritized using image sensor protocol metadata across any memory bus protocol such as, for example, open core protocol (OCP), Advanced eXtensible Interface (AXI), Intel® on-chip system fabric (IOSF), and so on. Similarly, while the memory bus protocol 22 may implement various arbitration schemes to prioritize memory traffic, image memory traffic may still be prioritized using image sensor protocol metadata across any arbitration scheme such as, for example, a round robin scheme, a weight scheme, a priority scheme, a deadline scheme, a buffer occupancy scheme, and so on.

In the illustrated example, the system 10 includes an arbitrator 24 to control access to the memory 16 over the memory bus protocol 22 by a single client when the memory 16 includes dedicated memory and/or by two or more clients when the memory 16 includes shared memory. In one example, the arbitrator 24 may implement a relatively simple round robin arbitration scheme using a default round robin rule to provide equal image memory traffic priority resulting in equal access by all clients sharing the memory 16. The arbitrator 24 may further implement a weight scheme using a weight value to arbitrate client access to the memory 16. In one example, the arbitrator 24 may compare an n-bit weight value (e.g. 4-bit value, etc.) assigned to each client to determine a percentage of memory bandwidth assigned to particular clients. Thus, for example, the arbitrator 24 may allow a GPU having a weight value of all ones to receive a majority of memory access relative to an ISP having a weight value of all zeros. In addition, the GPU and the ISP may each drive a same 4-bit value to force round robin memory access based on unity of weight values.

Similarly, OCP may specify an n-bit (e.g., 2-bit, etc.) priority scheme wherein priority of a memory request (e.g., read/write) may vary from lowest priority based on an all zero priority value to highest priority based on an all ones priority value. Thus, the arbitrator 24 may implement the 2-bit priority scheme to prioritize image memory traffic and to arbitrate client access to the memory 16 using the priority values. The arbitrator 24 may also implement a deadline arbitration scheme using a deadline to arbitrate client access to the memory 16. For example, IOSF may specify an n-bit (e.g., 16-bit, etc.) deadline scheme wherein an offset may be driven by a client from a global timer (e.g., constantly running to indicate a present time on an SoC) with every memory request, which specifies a time the memory request is to be completed (e.g., a deadline). Thus, for example, a memory request may specify completion of a memory transaction within time t=105 and the client 18 may drive 105 on the deadline, which the arbitrator 24 may use to arbitrate client access to the memory 16. A memory controller 26 (e.g., DRAM controller, etc.) may also use the deadline to manage memory refresh and provide relatively good power savings performance, discussed below.

In a further example, the arbitrator 24 may implement a buffer occupancy scheme using a buffer occupancy (e.g., a watermark value) and an indicator of traffic urgency (e.g., a priority value, a deadline, etc.) to arbitrate client access to the memory 16. For example, a first-in-first-out (FIFO) buffer at an output of the client 18 (e.g., an ISP) may be "N" entries deep (e.g., 100 entries deep), and the client 18 may drive an offset from the global timer based on a watermark value. A watermark of "X" entries (e.g., 25 entries) in IOSF may, for example, drive a very non-urgent deadline to a moderately urgent deadline, while a watermark of "Y" entries (e.g., 50 entries) may drive a moderately urgent deadline to a very urgent deadline. In this case, the client 18 may drive a very far out deadline (e.g., t=105) when a global timer is presently at t=5 and the FIFO is only 25 entries on the 100-deep FIFO, which the arbitrator 24 may use to arbitrate client access to the memory 16. In addition, the client 18 may drive a relatively more urgent deadline (e.g., t=50) when 50 entries on the 100-deep FIFO are reached, which the arbitrator 24 may use to arbitrate client access to the memory 16. The memory controller 26 may also use the deadline to manage memory refresh, discussed below.

The system 10 further includes an apparatus 28 that may have logic (e.g., logic instructions, configurable logic, fixed-functionality logic hardware, etc.) configured to implement any of the herein mentioned processes including, for example, memory traffic prioritization, arbitration of memory access, etc. Notably, any of the herein mentioned processes may be implemented based on image sensor protocol metadata corresponding to an image sensor physical layer (e.g., ISPLP metadata) and/or an image sensor link layer (e.g., ISLLP metadata), with or without traditional indicators.

In the illustrated example, the apparatus 28 includes a metadata identifier 30 to identify ISPLP metadata and/or ISLLP metadata. The metadata identifier 30 may identify, for example, physical layer image sensor power state mode data, physical layer image sensor escape mode data, physical layer image sensor clock mode data, physical layer SOL data, physical layer EOL data, and so on. For example, the metadata identifier 30 may identify a voltage for an entry to or exit from a ULPS, an entry to or exit from an EM, an enablement or disablement of a high-speed clock for an entry to or exit from a HSCM, a voltage or a short packet for an SOL or an EOL, etc. The metadata identifier 30 may also identify, for example, link layer SOL data, link layer EOL data, link layer SOF data, link layer EOF data, and so on. For example, the metadata identifier 30 may identify a line start code, a line end code, a frame start code, a frame end code, etc.

The apparatus 28 further includes a prioritizer 32 to define a priority for image memory traffic based on image sensor metadata. In one example, image data (e.g., pixel data) may be transferred from the image sensor 12 to the client 18 at a rate of 30 frames per second (fps), or a frame every 33 ms, and the metadata identifier 30 may identify an EOF at 5 ms. The prioritizer 32 may, in response, determine that no traffic will be received for 28 ms until a next frame starts based on the EOF and lower a priority of the memory traffic for the client 18. Thus, while a FIFO may traditionally become full and run out of buffering space based on an indication of high priority, the prioritizer 32 may deprioritize memory traffic to allow other memory traffic to be buffered and not dropped. Also, clients may not unnecessarily be restricted from access to the memory 16 between frames. The metadata identifier 30 may further identify a SOF and the prioritizer 32 may, in response, determine that FIFOs may not be full at the beginning of a frame and that image data from the image sensor 12 will be streamed relatively soon. Thus, the prioritizer 32 may raise a priority of the image data in response to the SOF.

The prioritizer 32 may further relatively increase a priority (e.g., prioritize) or relatively decrease a priority (e.g., deprioritize) of image data based on an entry to or exit from a ULPS, an entry to or exit from an EM, an enablement or disablement of a high-speed clock for an entry to or exit from a HSCM, a voltage or a short packet for an SOL or an EOL, a line start code, a line end code, and so on. In one example, the prioritizer 32 may deprioritize memory traffic when an EOL is identified since there may be a data gap between lines. In another example, the prioritizer 32 may prioritize memory traffic when a SOL is identified since there may be a large amount of data about to stream. Similarly, the prioritizer 32 may deprioritize memory traffic when a ULPS entry is identified since there may be a relatively small amount of incoming data, and/or may prioritize memory traffic when a ULPS exit is identified since there may be a relatively large amount of incoming data.

The apparatus 28 further includes an impact determiner 34 to determine an impact magnitude of image sensor protocol metadata. An impact magnitude may be based on, for example, an operational characteristic for an image device, an image sensor protocol to be implemented, a memory bus protocol to be implemented, an arbitration scheme to be implemented, and so on. In one example, the impact determiner 34 may determine an impact magnitude based on a scanning characteristic of the image sensor 12, a communication characteristic of the image sensor 12, and so on. For example, the impact determiner 34 may consider that the image sensor 12 scans across an image when offloading pixels to an SoC, left to right, and line-by-line, all the way down an image.

Accordingly, the impact determiner 34 may be aware that the image sensor 12 creates two blanking intervals. A horizontal blanking interval may correspond to an amount of time it takes between sending a previous line to sending a left-most pixel of a next line. In addition, a vertical blanking interval may correspond to an amount of time it takes between sending a last line of a frame to sending a first line of a next frame. Thus, the vertical blanking interval may be relatively smaller (e.g., orders of magnitude) than the horizontal blanking interval. The impact determiner 34 may, therefore, determine that an impact magnitude of an SOF and an EOF may be large relative to an impact magnitude of an SOL and an EOL based the scanning operational characteristic of the image sensor 12 and/or the transmission characteristic of the image sensor 12.

The prioritizer 32 further includes an augmenter 36 to augment a priority indicator based on an impact magnitude. Notably, the augmenter 36 may augment any priority indicator of any arbitration scheme implemented over any memory bus protocol using an impact magnitude for available and/or selected image sensor protocol metadata. In one example, the impact determiner 34 may determine an impact magnitude is to be "A" for an SOF and an EOF, wherein A may be a particular value based on a particular priority indicator of a particular arbitration scheme, and wherein the augmenter 36 may modify a priority indicator by ±A (e.g., +A for an SOF and −A for an EOF).

Similarly, for example, the impact determiner 34 may determine an impact magnitude is to be "B" for an SOL and an EOL, and the augmenter 36 may modify a priority indicator by ±B (e.g., +B for an SOL and −B for an EOL). The impact determiner 34 may further determine an impact magnitude is to be "C" for a ULPS exit and a ULPS entry, and the augmenter 36 may modify a priority indicator by ±C (e.g., +C for an exit and −C for an entry). The impact determiner 34 may also determine an impact magnitude is to be "D" for an EM exit and an EM entry, and the augmenter 36 may modify a priority indicator by ±D (e.g., +D for an exit and −D for an entry). The impact determiner 34 may further determine an impact magnitude is to be "E" for an HSCM exit and an HSCM entry, and the augmenter 36 may modify a priority indicator by ±E (e.g., +E for an entry and −E for an exit).

Accordingly, the augmenter 36 may add an impact magnitude to a default round robin rule in a round robin arbitration scheme. In this regard, the round robin arbitration scheme may be converted to a relatively more efficient arbitration scheme. In addition, the augmenter 36 may augment an n-bit weight value of a weight scheme. For example, the augmenter 36 may modify a 4-bit weight value of 8 with a value of −1 for an ISP when an EOL is identified and an impact magnitude is B=1. Thus, for example, the arbitrator 24 would allow a GPU having a 4-bit value of 8 to access the memory 16 more often than the ISP having the 4-bit weight value of 7.

In a further example, the augmenter 36 may augment a 4-bit weight value of 8 with a value of −8 for an ISP when an EOF is identified and an impact magnitude is A=8. Notably, an SOF and an EOF may cause a relatively larger modulation (e.g., A=8) than an SOL and an EOL (e.g., B=1) due to a relatively large horizontal blanking interval for the SOL and the EOL. Moreover, the arbitrator 24 may implement a best effort for ISP memory traffic while arbitrating memory access by other clients to the memory 16 based on image traffic priority. For example, the arbitrator 24 may allow a GPU having a 4-bit weight value of 8 four more operations involving the memory 16 than a CPU having a 4-bit weight value of 4, wherein the CPU may be allowed more operations involving the memory 16 than the ISP under best effort conditions.

In another example, the augmenter 36 may augment a priority indicator of traffic urgency in a buffer occupancy scheme. For example, the augmenter 36 may augment a deadline t=105 (e.g., not very urgent when current time t=0) with the value of −95 when an SOF is identified and an impact magnitude is A=95. Thus, image data may become relatively urgent with a deadline t=10 as soon as an SOF is identified to minimize lag. For example, the arbitrator 24 may allow access to the memory 16 relatively faster based on the deadline t=10. In addition, the augmenter 36 may augment the deadline t=105 with the value of 95 when an EOF is identified and an impact magnitude is A=95. Thus, the image data may become relatively less urgent with a deadline t=200 as soon as an EOF is identified to prevent unnecessary restriction of access by other clients. For example, the arbitrator 24 may allow access to other clients with more urgent traffic that are sharing the memory 16 based on the deadline t=200.

Additionally, the impact determiner 34 may determine an impact magnitude is to be a relative values such as "minimum", "lowest", "maximum", and/or "highest", and the augmenter 36 may modify a priority indicator to a maximum possible value for "maximum", a minimum possible value for "minimum", and so on. In another example, the impact determiner 34 may determine an impact magnitude is to be "A" for an SOF and is to be "A'" for an EOF, wherein A' may have the same units as A and be a different value (e.g., A=5, A'=−3). In this regard, the augmenter 36 may modify a priority indicator by ±A for the SOF and by ±A' for the EOF.

The apparatus 24 further includes an arbitrator controller 38 to control client access to the memory 16. The arbitrator controller 38 may, for example, communicate an impact magnitude for image memory traffic to the arbitrator 24 that may, in response, arbitrate access to the memory 16 based on the impact magnitude. The arbitrator controller 38 may also, for example, communicate an augmented priority indicator for image memory traffic augmentation to the arbitrator 24 that may, in response, arbitrate access to the memory 16 based on the augmented priority indicator. The arbitrator controller 38 may also communicate that image memory traffic is prioritized or deprioritized and the arbitrator 24 may, in response, arbitrate access to the memory 16 based on the prioritization or deprioritization.

The arbitrator controller 38 may, for example, communicate a deprioritization to the arbitrator 24 that may, in response, cause memory traffic to be buffer-up for a period of time (e.g., when memory is in a self-refresh state) to provide a relatively better power profile and/or burst access to the memory 16 (e.g., when memory is not in a self-refresh state) to provide a relatively better performance profile in a dedicated memory implementation. The arbitrator controller 38 may also, for example, communicate a deprioritization to the arbitrator 24 that may, in response, minimize unnecessary restriction of access to the memory 16 by other clients in a shared memory implementation. The arbitrator controller 38 may also communicate, for example, a prioritization of memory traffic to the arbitrator 24 that may, in response, minimize lag by providing access to the memory 16.

The apparatus 28 further includes a refresh controller 40 to control memory refresh by the memory controller 26. The refresh controller 40 may, for example, generate a control enter signal based on a deprioritization of memory traffic to cause the memory controller 26 to enter the memory 16 to a self-refresh state for a relatively better power profile. The refresh controller 40 may also, for example, generate a control exit signal based on a prioritization of memory traffic to cause the memory controller 26 to exit the memory 16 from a self-refresh state for a relatively better performance profile. Moreover, the refresh controller 40 may coordinate with the arbitrator controller 38 to concurrently modulate a self-refresh state of the memory 16 and control access to the memory 16 to provide a relatively better power and performance profile.

While examples have provided various components of the system 10 for illustration purposes, it should be understood that one or more components of the system 10 may reside in the same and/or different physical and/or virtual locations, may be combined, omitted, bypassed, re-arranged, and/or be utilized in any order. In one example, one or more components of the apparatus 28 may physically reside on the same computing platform as one or more components of the client 18, the arbitrator 24, the memory controller 26, and so on. In another example, one or more components of the apparatus 28 may be distributed among various computing platforms to provide distributed prioritization. Moreover, any or all components of the system 10 may be automatically implemented (e.g., without human intervention, etc.). For example, the metadata identifier 30 may automatically identify image sensor protocol metadata.

Figure 2:
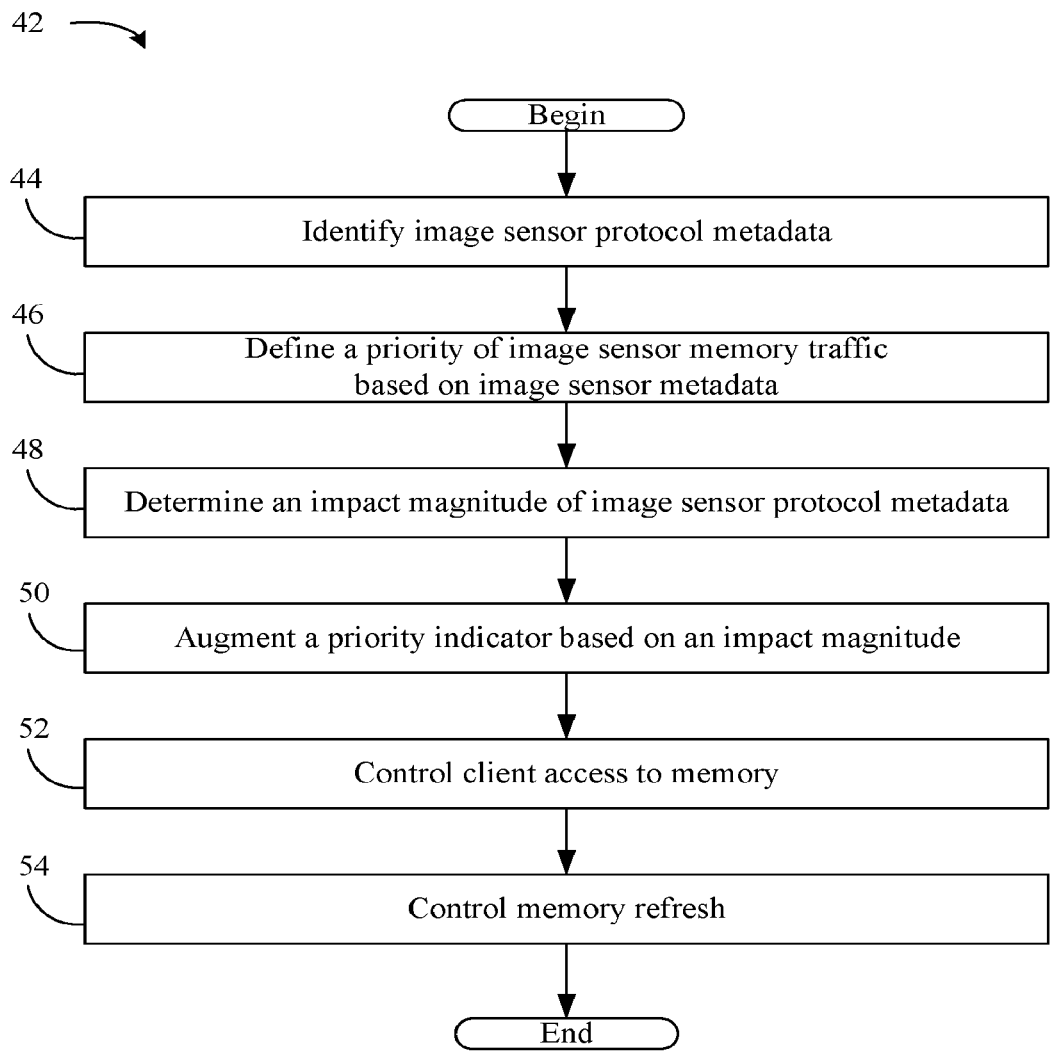
FIG. 2 is a flowchart of an example of a method to define a priority of memory traffic according to an embodiment.

Turning now to FIG. 2, a method 42 is shown to define a priority of memory traffic according to an embodiment. The method 42 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 42 may be written in any combination of one or more programming languages, including an object oriented programming language such as JAVA, SMALLTALK, C++ or the like and conventional procedural programming languages, such as the "C" programming language or similar programming languages.

Illustrated processing block 44 provides for identifying image sensor protocol metadata, which may correspond to an image sensor physical layer and/or an image sensor link layer. Block 44 may identify, for example, physical layer image sensor power state mode data, physical layer image sensor escape mode data, physical layer image sensor clock mode data, physical layer start of line data, physical layer end of line data, and so on. Block 44 may also identify, for example, link layer start of line data, link layer end of line data, link layer start of frame data, link layer end of frame data, and so on. For example, block 44 may identify a line start code, a line end code, a frame start code, a frame end code, and so on.

Illustrated processing block 46 provides for defining a priority of image memory traffic based on image sensor protocol metadata. Block 46 may, for example, prioritize image data by increasing relative priority of image data. Block 46 may also, for example, deprioritize image data by decreasing relative priority of image data. Illustrated processing block 48 provides for determining an impact magnitude of image sensor protocol metadata. Block 48 may, for example, determine an impact magnitude based on a scanning characteristic of an image sensor, a communication characteristic of an image sensor, and so on. For example, block 48 may determine that an impact magnitude of a start of frame and an end of frame may be large relative to an impact magnitude of a start of line and an end of line based a scanning operational characteristic of an image sensor, a transmission characteristic of an image sensor, and so on.

Illustrated processing block 50 provides for augmenting a priority indicator based on an impact magnitude. The priority indicator may include, for example, memory bus protocol metadata such as a round robin rule, a weight value, a priority value, a deadline, and/or a buffer occupancy. Thus, block 50 may augment (e.g., modify, modulate, etc.) a round robin rule, a weight value, a priority value, a deadline, and/or a buffer occupancy. In addition, illustrated processing block 52 provides for controlling client access to memory. Block 52 may, for example, control client access based on an impact magnitude. Block 52 may further control client access based on an augmented priority indicator. In addition, block 52 may control client access to memory based on a prioritization of image memory traffic, a deprioritization of image memory traffic, etc.

Illustrated processing block 54 provides for controlling memory refresh. Block 54 may, for example, generate a control enter signal based on a deprioritization of memory traffic to cause memory to enter to a self-refresh state for a relatively better power profile. Block 54 may also, for example, generate a control exit signal to cause memory to exit from a self-refresh state for a relatively better performance profile. Moreover, block 54 may coordinate with block 52 to concurrently modulate a self-refresh state for memory and control access to memory to provide a relatively better power and performance profile.

While independent blocks and/or a particular order has been shown for illustration purposes, it should be understood that one or more of the blocks of the method 42 may be combined, omitted, bypassed, re-arranged, and/or flow in any order. In addition, any or all blocks of the method 42 may include further techniques, including techniques to prioritize image traffic data, control access to memory, and so on. Moreover, any or all blocks of the method 42 may be automatically implemented (e.g., without human intervention, etc.). For example, block 44 may automatically identify image sensor protocol metadata.

Figure 3:
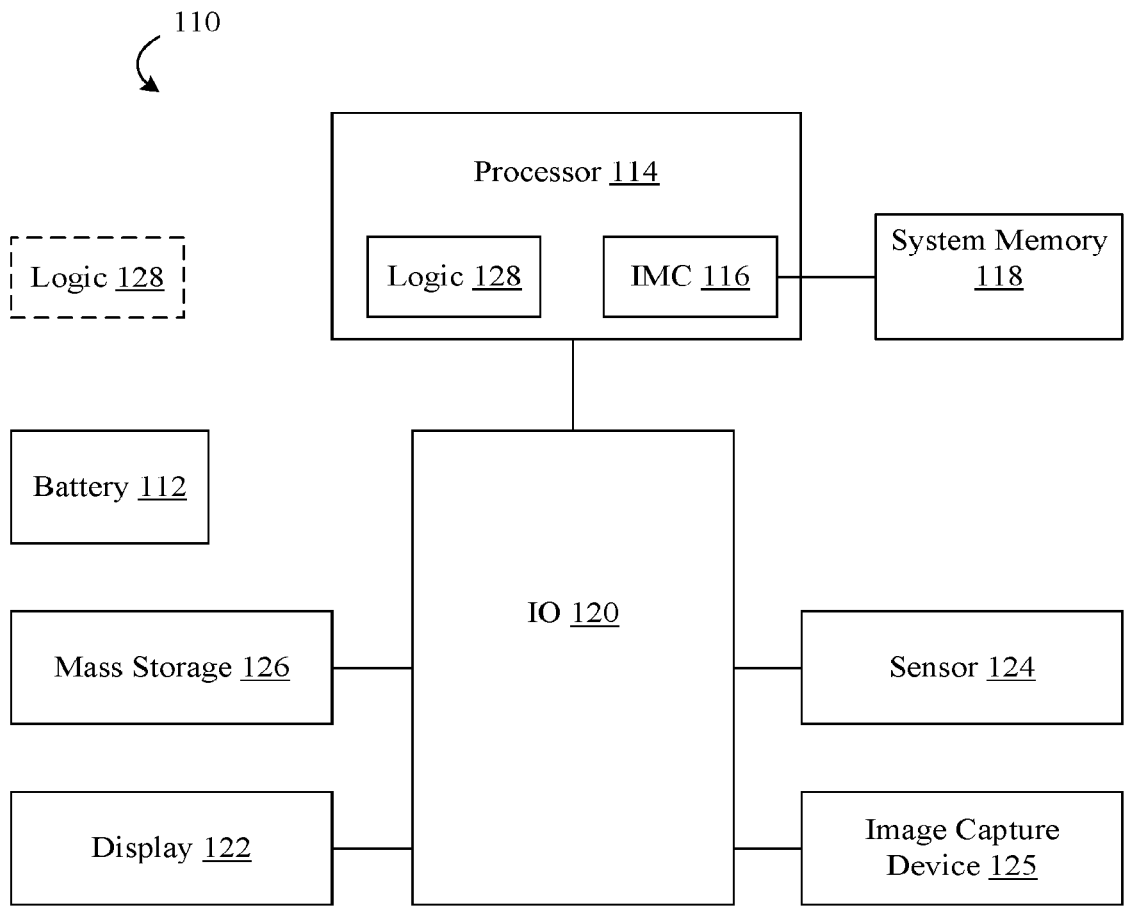
FIG. 3 is a block diagram of an example of a computing device according to an embodiment.

Turning now to FIG. 3, a computing device 110 is shown according to an embodiment. The computing device 110 may be part of a platform having computing functionality (e.g., personal digital assistant/PDA, notebook computer, tablet computer), communications functionality (e.g., wireless smart phone), imaging functionality, media playing functionality (e.g., smart television/TV), wearable functionality (e.g., watch, eyewear, headwear, footwear, jewelry) or any combination thereof (e.g., mobile Internet device/MID). In the illustrated example, the device 110 includes a battery 112 to supply power to the device 110 and a processor 114 having an integrated memory controller (IMC) 116, which may communicate with system memory 118. The system memory 118 may include, for example, dynamic random access memory (DRAM) configured as one or more memory modules such as, for example, dual inline memory modules (DIMMs), small outline DIMMs (SODIMMs), etc.

The illustrated device 110 also includes a input output (IO) module 120, sometimes referred to as a Southbridge of a chipset, that functions as a host device and may communicate with, for example, a display 122 (e.g., touch screen, liquid crystal display/LCD, light emitting diode/LED display), a sensor 124 (e.g., touch sensor, accelerometer, GPS, biosensor, etc.), an image capture device 125 (e.g., a camera, etc.), and mass storage 126 (e.g., hard disk drive/HDD, optical disk, flash memory, etc.). The processor 114 and the IO module 120 may be implemented together on the same semiconductor die as a system on chip (SoC).

The illustrated processor 114 may execute logic 128 (e.g., logic instructions, configurable logic, fixed-functionality logic hardware, etc., or any combination thereof) configured to implement any of the herein mentioned processes and/or technologies, including one or more components of the system 10 (FIG. 1) and/or one or more blocks of the method 42 (FIG. 2), discussed above. In addition, one or more aspects of the logic 128 may alternatively be implemented external to the processor 114. Thus, the computing device 110 may define a priority of image memory traffic, arbitrate memory access, etc.

ADDITIONAL NOTES AND EXAMPLES

Example 1 may include a system to define a priority of image memory traffic comprising an image sensor to provide image memory traffic, a metadata identifier to identify image sensor protocol metadata corresponding to one or more of an image sensor physical layer or an image sensor link layer, and a prioritizer to define a priority of the image memory traffic based on the image sensor protocol metadata.

Example 2 may include the system of Example 1, wherein the prioritizer is to include one or more of an impact determiner to determine an impact magnitude of the image sensor protocol metadata to define the priority of the image memory traffic, or an augmenter to augment a priority indicator based on the impact magnitude.

Example 3 may include the system of any one of Examples 1 to 2, wherein the image sensor protocol metadata is to include one or more of image sensor physical layer protocol metadata or image sensor link layer protocol metadata, and wherein the prioritizer is to prioritize the image memory traffic based on one or more of the image sensor physical layer protocol metadata or the image sensor link layer protocol metadata.

Example 4 may include an apparatus to define a priority of image memory traffic comprising a metadata identifier to identify image sensor protocol metadata corresponding to one or more of an image sensor physical layer or an image sensor link layer, and a prioritizer to define a priority of image memory traffic based on the image sensor protocol metadata.

Example 5 may include the apparatus of Example 4, wherein the prioritizer is to include an impact determiner to determine an impact magnitude of the image sensor protocol metadata to define the priority of the image memory traffic.

Example 6 may include the apparatus of any one of Examples 1 to 5, wherein the prioritizer is to include an augmenter to augment a priority indicator based on an impact magnitude of the image sensor protocol metadata to define the priority of the image memory traffic.

Example 7 may include the apparatus of any one of Examples 1 to 6, wherein the priority indicator is to include memory bus protocol metadata including one or more of a round robin rule, a weight value, a priority value, a deadline, or a buffer occupancy.

Example 8 may include the apparatus of any one of Examples 1 to 7, further including one or more of an arbitration controller to control client access to one or more of dedicated memory or shared memory, or a refresh controller to control refresh of one or more of the dedicated memory or the shared memory.

Example 9 may include the apparatus of any one of Examples 1 to 8, wherein the image sensor protocol metadata is to include one or more of image sensor physical layer protocol metadata or image sensor link layer protocol metadata, and wherein the prioritizer is to define the priority of the image memory traffic based on one or more of the image sensor physical layer protocol metadata or the image sensor link layer protocol metadata.

Example 10 may include the apparatus of any one of Examples 1 to 9, wherein the image sensor physical layer protocol metadata is to include one or more of physical layer power state mode data, physical layer escape mode data, physical layer clock mode data, physical layer start of line data, or physical layer end of line data, and wherein the image sensor link layer protocol metadata is to include one or more of link layer start of line data, link layer end of line data, link layer start of frame data, or link layer end of frame data.

Example 11 may include at least one computer readable storage medium comprising a set of instructions, which when executed by a device, cause the device to identify image sensor protocol metadata corresponding to one or more of an image sensor physical layer or an image sensor link layer, and define a priority of image memory traffic based on the image sensor protocol metadata.

Example 12 may include the at least one computer readable storage medium of Example 11, wherein the instructions, when executed, cause the device to determine an impact magnitude of the image sensor protocol metadata to define the priority of the image memory traffic.

Example 13 may include the at least one computer readable storage medium of any one of Examples 11 to 12, wherein the instructions, when executed, cause the device to augment a priority indicator based on an impact magnitude of the image sensor protocol metadata to define the priority of the image memory traffic.

Example 14 may include the at least one computer readable storage medium of any one of Examples 11 to 13, wherein the priority indicator is to include memory bus protocol metadata including one or more of a round robin rule, a weight value, a priority value, a deadline, or a buffer occupancy.

Example 15 may include the at least one computer readable storage medium of any one of Examples 11 to 14, wherein the instructions, when executed, cause the device to one or more of control client access to one or more of dedicated memory or shared memory, or control refresh of one or more of the dedicated memory or the shared memory.

Example 16 may include the at least one computer readable storage medium of any one of Examples 11 to 15, wherein the image sensor protocol metadata is to include one or more of image sensor physical layer protocol metadata or image sensor link layer protocol metadata, and wherein the instructions, when executed, cause the device to define the priority of the image memory traffic based on one or more of the image sensor physical layer protocol metadata or the image sensor link layer protocol metadata.

Example 17 may include the at least one computer readable storage medium of any one of Examples 11 to 16, wherein the image sensor physical layer protocol metadata is to include one or more of physical layer power state mode data, physical layer escape mode data, physical layer clock mode data, physical layer start of line data, or physical layer end of line data, and wherein the image sensor link layer protocol metadata is to include one or more of link layer start of line data, link layer end of line data, link layer start of frame data, or link layer end of frame data.

Example 18 may include a method to define a priority of memory traffic comprising identifying image sensor protocol metadata corresponding to one or more of an image sensor physical layer or an image sensor link layer, and defining a priority of image memory traffic based on the image sensor protocol metadata.

Example 19 may include the method of Example 18, further including determining an impact magnitude of the image sensor protocol metadata to define the priority of the image memory traffic.

Example 20 may include the method of any one of Examples 18 to 19, further including augmenting a priority indicator based on an impact magnitude of the image sensor protocol metadata to define the priority of the image memory traffic.

Example 21 may include the method of any one of Examples 18 to 20, wherein the priority indicator includes memory bus protocol metadata including one or more of a round robin rule, a weight value, a priority value, a deadline, or a buffer occupancy.

Example 22 may include the method of any one of Examples 18 to 21, further including one or more of controlling client access to one or more of dedicated memory or shared memory, or controlling refresh of one or more of the dedicated memory or the shared memory.

Example 23 may include the method of any one of Examples 18 to 22, wherein the image sensor protocol metadata includes one or more of image sensor physical layer protocol metadata or image sensor link layer protocol metadata, and wherein the method further includes defining the priority of the image memory traffic based on one or more of the image sensor physical layer protocol metadata or the image sensor link layer protocol metadata.

Example 24 may include the method of any one of Examples 18 to 23, wherein the image sensor physical layer protocol metadata includes one or more of physical layer power state mode data, physical layer escape mode data, physical layer clock mode data, physical layer start of line data, or physical layer end of line data, and wherein the image sensor link layer protocol metadata includes one or more of link layer start of line data, link layer end of line data, link layer start of frame data, or link layer end of frame data.

Example 25 may include an apparatus to define a priority of image memory traffic comprising means for performing the method of any one of Examples 18 to 24.

Notably, camera sensor communication may require availability of image sensor protocol metadata. Accordingly, embodiments may operate across a wide range of physical layer specifications and protocol layer specifications. Similarly, memory arbitration may be applicable across a wide range of protocols and schemes. A variety of arbitration parameters may be derived from image sensor protocol metadata based on, for example, available control over an arbitration scheme.

Embodiment may utilize, for example, image sensor protocol metadata (e.g., MIPI D-PHY, CSI, etc.) solely and/or in conjunction with traditional priority indicators to intelligently prioritize pixel traffic from a camera sensor for DRAM arbitration. In one example, embodiments may avoid use of large on-chip data buffers that may minimize silicon area. In addition, embodiments may avoid traffic pattern estimation.

Embodiments may utilize native image sensor protocol data (e.g., native pattern indicators) directly from a camera sensor to allow DRAM arbitration priority to be adjusted more quickly. Embodiments may, for example, raise priority as soon a line of image data begins transmission rather than waiting for a pixel buffer occupancy to exceed a predetermined watermark, may lower priority immediately upon identifying an end of frame, and so on. For example, embodiments may raise a deadline to urgent when a SOL short packet is identified on a MIPI CSI D-PHY physical interface, and lower the deadline to non-urgent when an EOL short packet is seen on the MIPI CSI D-PHY physical interface.

Thus, techniques described herein provide for relatively good performance (e.g., relatively better bandwidth). For example, priority may not be raised soon enough when camera data is streaming and an arbitrator is waiting to reach a predetermined watermark (e.g., bad priority indicator may lags data input). Embodiments may, however, raise priority as soon as data is to be input for relatively better performance in dedicated memory and/or shared memory implementations. Moreover, client starving may be minimized since a client may not unnecessarily be restricted access to shared memory when another client is not presently causing image data to be transmitted. In addition, embodiments may provide relatively good power profiles since memory may be intelligently placed in self-refresh for a longer time period.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An apparatus to define a priority of memory traffic, the apparatus comprising:
   metadata identifier circuitry to identify image sensor protocol metadata associated with one or more images;
   impact determiner circuitry to determine an impact magnitude of the image sensor protocol metadata; and arbitrator circuitry to arbitrate access to a memory based on the impact magnitude, the memory to store the one or more images.

2. The apparatus of claim 1, further including augmenter circuitry to augment a priority indicator based on the impact magnitude of the image sensor protocol metadata to define an image memory traffic priority.

3. The apparatus of claim 2, wherein the priority indicator includes memory bus protocol metadata including one or more of a round robin rule, a weight value, a priority value, a deadline, or a buffer occupancy.

4. The apparatus of claim 2, wherein the image sensor protocol metadata includes one or more of image sensor physical layer protocol metadata or image sensor link layer protocol metadata, and wherein the apparatus further includes prioritizer circuitry that includes the impact determiner circuitry and the augmenter circuitry to define the image memory traffic priority based on one or more of the image sensor physical layer protocol metadata or the image sensor link layer protocol metadata.

5. The apparatus of claim 4, wherein the image sensor physical layer protocol metadata includes one or more of physical layer power state mode data, physical layer escape mode data, physical layer clock mode data, physical layer start of line data, or physical layer end of line data, and wherein the image sensor link layer protocol metadata includes one or more of link layer start of line data, link layer end of line data, link layer start of frame data, or link layer end of frame data.

6. The apparatus of claim 1, further including refresh controller circuitry to control refresh of the memory.

7. A system-on-chip including the apparatus of claim 1.

8. At least one non-transitory computer readable storage medium comprising instructions, which when executed by a device to define a priority of memory traffic, cause the device to:
identify image sensor protocol metadata corresponding to one or more of an image sensor physical layer or an image sensor link layer;
determine an impact magnitude associated with a memory access request; and
arbitrate access to memory based on the impact magnitude.

9. The at least one non-transitory computer readable storage medium of claim 8, wherein the instructions, when executed, cause the device to define an image memory traffic priority based on the image sensor protocol metadata.

10. The at least one non-transitory computer readable storage medium of claim 9, wherein the instructions, when executed, cause the device to augment a priority indicator based on the impact magnitude of the image sensor protocol metadata to define the image memory traffic priority.

11. The at least one non-transitory computer readable storage medium of claim 10, wherein the priority indicator includes memory bus protocol metadata including one or more of a round robin rule, a weight value, a priority value, a deadline, or a buffer occupancy.

12. The at least one non-transitory computer readable storage medium of claim 9, wherein the image sensor protocol metadata includes one or more of image sensor physical layer protocol metadata or image sensor link layer protocol metadata, and wherein the instructions, when executed, cause the device to define the image memory traffic priority based on one or more of the image sensor physical layer protocol metadata or the image sensor link layer protocol metadata.

13. The at least one non-transitory computer readable storage medium of claim 12, wherein the image sensor physical layer protocol metadata includes one or more of physical layer power state mode data, physical layer escape mode data, physical layer clock mode data, physical layer start of line data, or physical layer end of line data, and wherein the image sensor link layer protocol metadata includes one or more of link layer start of line data, link layer end of line data, link layer start of frame data, or link layer end of frame data.

14. The at least one non-transitory computer readable storage medium of claim 8, wherein the instructions, when executed, cause the device to one or more of:
control client access to the memory; or
control refresh of the memory.

15. A method for defining to define a priority of memory traffic, the method comprising:
accessing a memory access request associated with transfer of one or more images to a memory;
identifying image sensor protocol metadata associated with the one or more images;
determining an impact magnitude associated with the memory access request; and
controlling access to the memory based on the impact magnitude.

16. The method of claim 15, further including defining an image memory traffic priority based on the image sensor protocol metadata.

17. The method of claim 16, further including augmenting a priority indicator based on the impact magnitude to define the image memory traffic priority.

18. The method of claim 17, wherein the priority indicator includes memory bus protocol metadata including one or more of a round robin rule, a weight value, a priority value, a deadline, or a buffer occupancy.

19. The method of claim 16, wherein the image sensor protocol metadata includes one or more of image sensor physical layer protocol metadata or image sensor link layer protocol metadata, and wherein the method further includes defining the image memory traffic priority based on one or more of the image sensor physical layer protocol metadata or the image sensor link layer protocol metadata.

20. The method of claim 19, wherein the image sensor physical layer protocol metadata includes one or more of physical layer power state mode data, physical layer escape mode data, physical layer clock mode data, physical layer start of line data, or physical layer end of line data, and wherein the image sensor link layer protocol metadata includes one or more of link layer start of line data, link layer end of line data, link layer start of frame data, or link layer end of frame data.

21. An apparatus comprising:
at least one memory;
instructions in the apparatus; and
processor circuitry to execute the instructions to:
identify image sensor protocol metadata associated with one or more images;
determine an impact magnitude of the image sensor protocol metadata; and
arbitrate access to the at least one memory based on the impact magnitude, the one or more images stored in the at least one memory.

22. The apparatus of claim 21, wherein the processor circuitry is to execute the instructions to augment a priority indicator based on the impact magnitude of the image sensor protocol metadata to define an image memory traffic priority.

23. The apparatus of claim 22, wherein the priority indicator includes memory bus protocol metadata including one or more of a round robin rule, a weight value, a priority value, a deadline, or a buffer occupancy.

24. The apparatus of claim 22, wherein the image sensor protocol metadata includes one or more of image sensor physical layer protocol metadata or image sensor link layer protocol metadata, and wherein the processor circuitry is to execute the instructions to define the image memory traffic priority based on one or more of the image sensor physical layer protocol metadata or the image sensor link layer protocol metadata.

25. The apparatus of claim 24, wherein the image sensor physical layer protocol metadata includes one or more of physical layer power state mode data, physical layer escape mode data, physical layer clock mode data, physical layer start of line data, or physical layer end of line data, and wherein the image sensor link layer protocol metadata includes one or more of link layer start of line data, link layer end of line data, link layer start of frame data, or link layer end of frame data.

26. The apparatus of claim 21, wherein the processor circuitry is to execute the instructions to control refresh of the memory.

* * * * *

UNITED STATES PATENT AND TRADEMARK OFFICE
CERTIFICATE OF CORRECTION

PATENT NO. : 11,258,921 B2
APPLICATION NO. : 17/098820
DATED : February 22, 2022
INVENTOR(S) : Wesley J. Holland It is certified that error appears in the above-identified patent and that said Letters Patent is hereby corrected as shown below:

In the Claims

Column 16, Line 17 (Claim 15): Delete "for defining".

Signed and Sealed this
Twenty-seventh Day of September, 2022

Katherine Kelly Vidal
*Director of the United States Patent and Trademark Office*